(12) United States Patent
Sarfati et al.

(10) Patent No.: US 11,822,601 B2
(45) Date of Patent: Nov. 21, 2023

(54) ENSEMBLE-BASED DATA COMPARISON

(71) Applicant: Spotify AB, Stockholm (SE)

(72) Inventors: Marc Sarfati, Paris (FR); Jonathan Donier, London (GB)

(73) Assignee: Spotify AB, Stockholm (SE)

( * ) Notice: Subject to any disclaimer, the term of this patent is extended or adjusted under 35 U.S.C. 154(b) by 405 days.

(21) Appl. No.: 16/797,415

(22) Filed: Feb. 21, 2020

(65) Prior Publication Data
US 2020/0293630 A1 Sep. 17, 2020

(30) Foreign Application Priority Data
Mar. 15, 2019 (EP) .................................... 19163047

(51) Int. Cl.
| | |
|---|---|
| *G06F 16/68* | (2019.01) |
| *G06F 21/10* | (2013.01) |
| *G06F 18/22* | (2023.01) |
| *G06F 18/23* | (2023.01) |

(52) U.S. Cl.
CPC .............. *G06F 16/68* (2019.01); *G06F 18/22* (2023.01); *G06F 18/23* (2023.01); *G06F 21/10* (2013.01)

(58) Field of Classification Search
USPC ........................................................ 726/26
See application file for complete search history.

(56) References Cited

U.S. PATENT DOCUMENTS

| | | |
|---|---|---|
| 9,153,239 B1 | 10/2015 | Postelnicu et al. |
| 9,319,782 B1 | 4/2016 | Crump et al. |
| 9,361,885 B2 | 6/2016 | Ganong |

(Continued)

FOREIGN PATENT DOCUMENTS

| | | |
|---|---|---|
| CN | 108847219 A | 11/2018 |
| CN | 109286875 A | 1/2019 |

(Continued)

OTHER PUBLICATIONS

Tao Li et al.. 2003. A comparative study on content-based music genre classification. In Proceedings of the 26th annual international ACM SIGIR conference on Research and development in informaion retrieval (SIGIR '03). Association for Computing Machinery, New York, NY, USA, 282-289 (Year: 2003).*

Bingham, "A fast fixed-point algorithm for independent component analysis of complex valued signals," Neural Networks Research Centre, Helsinki University of Technology, Finland, Jan. 19, 2000, 16 pgs.

(Continued)

*Primary Examiner* — Michael Young
(74) *Attorney, Agent, or Firm* — Morgan, Lewis & Bockius LLP

(57) ABSTRACT

The present disclosure relates to the comparison of data items, such as media data items or streams, e.g. audio files or streams, to determine a similarity between the data items. A device receives a plurality, or ensemble, of data items, and calculates the pairwise similarity scores between a number of unique pairs of data items within the ensemble. For any given pair of data items, the pairwise similarity score is compared with an overall similarity score for an "indirect path" connecting the pair of data items via one or more intermediate data items. If the indirect path indicates a closer similarity between the data items, the pairwise score is updated based on the overall similarity score of the indirect path. The updated similarity score generated by this comparison then provides an improved indication of the similarity of the data items compared to the prior art method.

17 Claims, 5 Drawing Sheets

(56) References Cited

U.S. PATENT DOCUMENTS

| | | |
|---|---|---|
| 9,431,021 B1 | 8/2016 | Scalise et al. |
| 9,443,527 B1 | 9/2016 | Watanabe |
| 9,640,179 B1 | 5/2017 | Hart et al. |
| 9,684,715 B1 | 6/2017 | Ross et al. |
| 9,734,845 B1 | 8/2017 | Liu et al. |
| 9,779,732 B2 | 10/2017 | Lee |
| 9,779,734 B2 | 10/2017 | Lee |
| 9,794,710 B1 | 10/2017 | Sheen |
| 9,805,733 B2 | 10/2017 | Park |
| 9,916,839 B1 | 3/2018 | Scalise et al. |
| 9,940,949 B1 | 4/2018 | Vitaladevuni et al. |
| 9,947,333 B1 | 4/2018 | David |
| 10,074,371 B1 | 9/2018 | Wang et al. |
| 10,134,388 B1 | 11/2018 | Lilly |
| 10,186,266 B1 | 1/2019 | Devaraj |
| 10,192,546 B1 | 1/2019 | Piersol et al. |
| 10,229,680 B1 | 3/2019 | Gillespie |
| 10,283,116 B2 | 5/2019 | Ko et al. |
| 10,297,266 B1 | 5/2019 | Burenius et al. |
| 10,304,475 B1 | 5/2019 | Wang et al. |
| 10,339,957 B1 | 7/2019 | Chenier |
| 10,365,887 B1 | 7/2019 | Mulherkar |
| 10,438,591 B1 | 10/2019 | Sharifi |
| 10,445,365 B2 | 10/2019 | Luke |
| 10,515,625 B1 | 12/2019 | Metallinou |
| 10,573,312 B1 | 2/2020 | Thomson |
| 10,600,406 B1 | 3/2020 | Shapiro |
| 10,623,811 B1 | 4/2020 | Cwlk |
| 10,643,609 B1 | 5/2020 | Pogue |
| 10,685,669 B1 | 6/2020 | Lan |
| 10,706,843 B1 | 7/2020 | Elangovan |
| 10,728,196 B2 | 7/2020 | Wang |
| 10,734,024 B1 * | 8/2020 | Soni .................. G11B 27/28 |
| 10,847,149 B1 | 11/2020 | Mok |
| 10,867,596 B2 | 12/2020 | Yoneda |
| 10,878,826 B2 | 12/2020 | Li |
| 2001/0003173 A1 | 6/2001 | Lim |
| 2004/0128135 A1 | 7/2004 | Anastasakos |
| 2006/0206340 A1 | 9/2006 | Silvera |
| 2011/0046952 A1 | 2/2011 | Koshinaka |
| 2011/0131032 A1 | 6/2011 | Yang |
| 2012/0011105 A1 * | 1/2012 | Brock .................. G06F 21/10 |
| | | 707/694 |
| 2013/0013315 A1 | 1/2013 | Burke et al. |
| 2014/0149118 A1 | 5/2014 | Lee |
| 2014/0185815 A1 | 7/2014 | Robleck et al. |
| 2014/0196075 A1 | 7/2014 | Park |
| 2014/0254816 A1 | 9/2014 | Kim et al. |
| 2014/0278372 A1 | 9/2014 | Nakadai |
| 2014/0303969 A1 | 10/2014 | Inose |
| 2014/0334645 A1 | 11/2014 | Yun |
| 2014/0358535 A1 | 12/2014 | Lee |
| 2015/0006176 A1 | 1/2015 | Pogue et al. |
| 2015/0039317 A1 | 2/2015 | Klein |
| 2015/0058018 A1 | 2/2015 | Georges |
| 2015/0111539 A1 | 4/2015 | Shim |
| 2015/0162006 A1 | 6/2015 | Kummer |
| 2015/0296268 A1 | 10/2015 | Lee |
| 2015/0331666 A1 | 11/2015 | Bucsa et al. |
| 2016/0055850 A1 | 2/2016 | Nakadai |
| 2016/0071526 A1 | 3/2016 | Wingate et al. |
| 2016/0077794 A1 | 3/2016 | Kim et al. |
| 2016/0140957 A1 | 5/2016 | Duta |
| 2016/0148615 A1 | 5/2016 | Lee |
| 2016/0156766 A1 | 6/2016 | Nishikawa |
| 2016/0217789 A1 | 7/2016 | Lee |
| 2016/0307570 A1 | 10/2016 | Mizumoto et al. |
| 2017/0032244 A1 | 2/2017 | Kurata |
| 2017/0053648 A1 | 2/2017 | Chi |
| 2017/0053650 A1 | 2/2017 | Ogawa |
| 2017/0069321 A1 | 3/2017 | Toiyama |
| 2017/0076720 A1 | 3/2017 | Gopalan |
| 2017/0076726 A1 | 3/2017 | Bae |
| 2017/0090864 A1 | 3/2017 | Jorgovanovic |
| 2017/0097992 A1 | 4/2017 | Voulin et al. |
| 2017/0103755 A1 | 4/2017 | Jeon |
| 2017/0242651 A1 | 8/2017 | Lang |
| 2017/0242653 A1 | 8/2017 | Lang |
| 2017/0242657 A1 | 8/2017 | Jarvis et al. |
| 2017/0300990 A1 | 10/2017 | Tanaka |
| 2018/0012593 A1 | 1/2018 | Prasad et al. |
| 2018/0033428 A1 | 2/2018 | Kim |
| 2018/0122378 A1 | 5/2018 | Mixter et al. |
| 2018/0165055 A1 | 6/2018 | Yu et al. |
| 2018/0182383 A1 | 6/2018 | Kim |
| 2018/0182397 A1 | 6/2018 | Carbune |
| 2018/0188948 A1 | 7/2018 | Quyang |
| 2018/0189390 A1 | 7/2018 | Crèmer et al. |
| 2018/0190264 A1 | 7/2018 | Mixter |
| 2018/0211665 A1 | 7/2018 | Park |
| 2018/0211666 A1 | 7/2018 | Kolavennu |
| 2018/0233136 A1 | 8/2018 | Torok et al. |
| 2018/0233137 A1 | 8/2018 | Torok et al. |
| 2018/0233142 A1 | 8/2018 | Koishida |
| 2018/0286394 A1 | 10/2018 | Li |
| 2018/0286414 A1 | 10/2018 | Ravindran |
| 2018/0286433 A1 | 10/2018 | Hicks et al. |
| 2018/0324536 A1 | 11/2018 | Drinkwater |
| 2018/0349093 A1 | 12/2018 | McCarty |
| 2019/0051298 A1 | 2/2019 | Lee |
| 2019/0073999 A1 | 3/2019 | Premont et al. |
| 2019/0074014 A1 | 3/2019 | Wilberding |
| 2019/0081810 A1 | 3/2019 | Jung |
| 2019/0087455 A1 | 3/2019 | He |
| 2019/0096419 A1 | 3/2019 | Giacobello |
| 2019/0115018 A1 | 4/2019 | Zurek et al. |
| 2019/0124388 A1 | 4/2019 | Schwartz |
| 2019/0205432 A1 * | 7/2019 | Kashyap ........... G06F 16/24578 |
| 2019/0205467 A1 * | 7/2019 | Wold .................... G06F 16/686 |
| 2019/0206391 A1 | 7/2019 | Busch |
| 2019/0237067 A1 | 8/2019 | Friedman |
| 2019/0244608 A1 | 8/2019 | Choi |
| 2019/0251960 A1 | 8/2019 | Maker et al. |
| 2019/0295542 A1 | 9/2019 | Huang |
| 2019/0319960 A1 | 10/2019 | Shen |
| 2019/0320260 A1 | 10/2019 | Alders et al. |
| 2019/0348044 A1 | 11/2019 | Chun |
| 2019/0355365 A1 | 11/2019 | Kim et al. |
| 2019/0362714 A1 | 11/2019 | Mori |
| 2020/0066271 A1 | 2/2020 | Li et al. |
| 2020/0074990 A1 | 3/2020 | Kim |
| 2020/0074995 A1 | 3/2020 | Rosenberg |
| 2020/0077218 A1 * | 3/2020 | Nakadai .................. G01S 3/803 |
| 2020/0098354 A1 | 3/2020 | Lin |
| 2020/0105245 A1 | 4/2020 | Gupta |
| 2020/0105264 A1 | 4/2020 | Jang |
| 2020/0211539 A1 | 7/2020 | Lee |
| 2020/0211550 A1 | 7/2020 | Pan |
| 2020/0219493 A1 | 7/2020 | Li |
| 2020/0221180 A1 | 7/2020 | Pietsch |
| 2020/0234709 A1 | 7/2020 | Kunitake |
| 2020/0265838 A1 | 8/2020 | Lee |
| 2020/0310751 A1 | 10/2020 | Anand |
| 2020/0357374 A1 | 11/2020 | Verweij et al. |
| 2020/0367006 A1 | 11/2020 | Beckhardt |
| 2020/0374269 A1 | 11/2020 | Lidman |
| 2020/0402490 A1 | 12/2020 | Duthaler |
| 2021/0067867 A1 | 3/2021 | Kagoshima |
| 2021/0349982 A1 | 11/2021 | Frederickson |

FOREIGN PATENT DOCUMENTS

| | | | |
|---|---|---|---|
| CN | 109741755 A | 5/2019 | |
| DK | 201770421 A1 | 12/2018 | |
| EP | 2306344 A1 | 4/2011 | |
| EP | 2939103 A2 | 11/2015 | |
| EP | 2965496 A1 | 1/2016 | |
| EP | 2965496 B1 | 1/2018 | |
| EP | 3306892 A1 | 4/2018 | |
| EP | 4187405 A1 * | 5/2023 | ........... G06F 16/634 |
| WO | WO2009/001202 A1 | 12/2008 | |
| WO | WO2017/197184 A1 | 11/2017 | |
| WO | WO2018/211983 A1 | 11/2018 | |
| WO | WO2018/236952 A1 | 12/2018 | |

(56) References Cited

FOREIGN PATENT DOCUMENTS

| WO | WO2019034083 A1 | 2/2019 |
| WO | WO2019046173 A1 | 3/2019 |
| WO | WO2019/160787 A1 | 8/2019 |
| WO | WO2019222996 A1 | 11/2019 |

OTHER PUBLICATIONS

E&T Engineering and Technology, "Amazon proposes bundling multiple virtual assistants in a single device," Sep. 25, 2019, downloaded from https://eandt.theiet.org/content/articles/2019/amazon-proposes-bundling-multiple-virtual-assistnts-in-a-single-device/, 4 pgs.
Bromand, Notice of Allowance, U.S. Appl. No. 16/562,318, dated Jun. 29, 2020, 9 pgs.
Bromand, Notice of Allowance, U.S. Appl. No. 16/557,734, dated Apr. 16, 2021, 14 pgs.
Bromand, Office Action, U.S. Appl. No. 16/787,993, dated Jun. 14, 2021, 23 pgs.
Saruwatari, "Blind Source Separation Combining Independent Component analysis and Beamforming," EURASIP Journal on Applied Signal Processing 2003:11, 1135-1146, ©2003 Hindawi Publishing Corporation, 12 pgs.
Spotify AB, Extended European Search Report, EP20170208.1, dated Oct. 9, 2020, 6 pgs.
Spotify AB, Extended European Search Report, EP20178734.8, dated Nov. 26, 2020, 10 pgs.
Spotify AB, Extended European Search Report, EP20179016.9, dated Aug. 14, 2020, 7 pgs.
Spotify AB, Extended European Search Report, EP20217407.4, dated Jun. 17, 2021, 27 pgs.
Bromand, Notice of Allowance, U.S. Appl. No. 16/787,993, dated Dec. 15, 2021, 9 pgs.
Bromand, Office Action, U.S. Appl. No. 16/788,067, dated Sep. 14, 2021, 21 pgs.
Bromand, Notice of Allowance, U.S. Appl. No. 16/788,067, dated Jan. 7, 2022, 10 pgs.
Bromand, Office Action, U.S. Appl. No. 17/033,326, dated Dec. 24, 2021, 10 pgs.
Ragno R, et al., "Inferring similarity between music objects with application to playlist generation," Multimedia Information Retrieval, ACM, 2 Penn Plaza, Suite 701, New York, NY 10121-0701 USA, Nov. 10, 2005, pp. 73-80, XP058245557.
Spotify AB, Communication Pursuant to Article 94(3), EP19163047.4, dated Feb. 28, 2022, 9 pgs.
Spotify AB, Communication Pursuant to Article 94(3), EP20170208.1, dated Feb. 11, 2022, 5 pgs.
Heo et al., Cover Song Identification with Metric Learning Using Distance as a Feature, 18th International Society for Music Information Retrieval Conference, Suzhou, China 2017, 7 pgs.
Singh et al. "A loss function for classification based on a robust similarity metric," 978-1-4244-B126-2/10, © 2010, 6 pgs.
Spotify AB, Extended European Search Report, EP19163047.4, dated Jun. 17, 2019, 9 pgs.
Bromand, Final Office Action, U.S. Appl. No. 17/033,326, dated Dec. 22, 2022, 14 pgs.
Spotify AB, Extended European Search Report, EP22209659.6, dated Jan. 2, 2023, 12 pgs.
Bromand, Office Action, U.S. Appl. No. 17/033,326, dated Aug. 18, 2022, 11 pgs.
Bromand, Notice of Allowance, U.S. Appl. No. 17/375,962, dated Sep. 21, 2022, 15 pgs.
Spotify AB, Summons to Attend Oral Proceedings, EP19163047.4, Nov. 3, 2022, 9 pgs.
Spotify AB, Summons to attend oral proceedings pursuant to Rule 115(1) EPC, EP20178734.8, Oct. 5, 2022, 11 pgs.
Spotify AB, Summons to Attend Oral Proceedings Pursuant to rule 115(1), EP20179016.9, dated May 31, 2022, 9 pgs.
Spotify AB, Decision to Grant, EP20217407.4, dated Nov. 4, 2022, 2 pgs.
Bromand, Final Office Action, U.S. Appl. No. 17/033,326, dated Mar. 28, 2022, 11 pgs.

* cited by examiner

ENSEMBLE-BASED DATA COMPARISON

RELATED APPLICATIONS

This application claims priority to European Patent Application 19163047.4, filed Mar. 15, 2019, which is hereby incorporated by reference in its entirety.

TECHNICAL FIELD

The present disclosure relates to the comparison of data items, such as media data items or streams, e.g. audio files or streams, to determine a similarity between the data items. An indication of the similarity can then be output. In this way, the present disclosure may be used to determine whether two or more data items correspond to the same media composition.

BACKGROUND

With the rise of online streaming services, it is becoming easier for content producers and content produces to share their content (e.g., music) with the rest of the world. From a legal perspective, the democratization of content sharing makes enforcement of copyright laws difficult. With users constantly adding and sharing content items, catalogues that can reach up to tens of millions of tracks. It is simply impossible for humans to quickly, effectively, and efficiently monitor user uploads to determine whether users are violating copyrights.

From a musical perspective, it is also helpful to detect composition similarities between tracks. This problem is often known as the cover song detection problem. This is, however, a very challenging problem from a content analysis point of view, as artists can make their own version of a composition by modifying any number of elements—instruments, harmonies, melody, rhythm, structure, timbre, vocals, lyrics, among others.

Prior art techniques for detecting whether two tracks share the same underlying composition are computationally expensive and cannot be run at scale. Furthermore, these techniques struggle to identify cover versions that more significantly differ from the original recording, even while still corresponding to the same underlying composition.

Furthermore, while the embodiments of the present disclosure are advantageously applied to the problem of identifying cover versions of musical compositions, some embodiments are more broadly applicable. While the composition is a common elements that can tie many different audio tracks together, other data types may have corresponding commonalities. For example, audio or video files are often converted from one format to another when uploading or downloading from the internet. This conversion, or re-encoding, can change properties of the underlying data, particularly when lossy data compression is used. Thus, two different versions of an audio track or video may relate to the same original source, but may still differ significantly.

The embodiments of the present disclosure therefore aim to accurately and efficiently identify different versions of data items, e.g. audio tracks or videos, corresponding to the same composition or original recording.

SUMMARY

According to a first aspect of the present disclosure, a computer-implemented method for determining similarity between audio data items is provided. The method comprises:

receiving a plurality of audio data items;

calculating a plurality of pairwise similarity scores between the plurality of audio data items, wherein each pairwise similarity score is calculated for a unique pair of audio data items; and identifying an updated similarity score between a first audio data item and a second audio data item by comparing a pairwise similarity score between the first and second audio data items with an overall similarity score between the first and second audio data items and at least one intermediate audio data item;

wherein the updated similarity score corresponds to the similarity of the first audio data item to the second audio data item.

Identifying an updated similarity score between the first audio data item and the second audio data item may further comprise replacing the pairwise similarity score with the overall similarity score if the overall similarity score indicates a higher similarity than the pairwise similarity score between the first audio data item and second audio data item. The overall similarity score may be calculated based on pairwise similarity scores between audio data items in an indirect path between the first audio data item and the second audio data item, and the indirect path may define a continuous chain of pairwise similarity scores between the first audio data item and the second audio data item and includes at least one intermediate audio data item that is different to the first and second audio data items.

Prior to receiving the plurality of audio data items, the plurality of audio data items may be filtered based on metadata of the audio data items.

The filtering may be based on a similarity between the metadata of the plurality of audio data items to a reference audio data item, and audio data items with metadata dissimilar to a reference audio data item may be removed from the plurality of audio data items.

The plurality of unique pairs of audio data items for which a pairwise similarity score is calculated is may be subset of the set of all of the unique pairs of audio data items, and default pairwise similarity scores may be assigned to the unique pairs of audio data items for which a pairwise similarity score is not calculated.

The pairwise similarity score between two audio data items may be calculated by extracting a plurality of audio features from the two audio data items and comparing the audio features of the two audio data items to generate the pairwise similarity score.

The method may further comprise, prior to the step of identifying an updated similarity score, applying a squashing function to the pairwise similarity scores.

The step of identifying an updated similarity score may be performed for multiple pairs of audio data items.

The step of identifying an updated similarity score may be iteratively repeated until a stop condition is met. The stop condition may be met when the step of identifying ceases to update any of the stored pairwise similarity scores or when a predetermined number of iterations have been completed.

The method may further comprise determining that the first audio data and the second audio data item match if the updated similarity score satisfies a criterion. The criterion is that the similarity score is above or below a threshold value. The threshold value may correspond to the similarity score for a third audio data item that is known to relate to a different composition or version to the first and/or second audio data item. Alternatively, the threshold value may be determined by computing a distribution of the similarity scores between the first audio data item and the remaining audio data items, identifying modes of the distribution corresponding to matching and non-matching audio data items, and setting the threshold at a value located between the two modes.

The method may further comprise applying a hierarchical clustering algorithm to the updated similarity scores and calculating a cophenetic distance from the first audio data item to the second audio data item, wherein the cophenetic distance corresponds to a final similarity score. The similarity score may indicate whether the first audio data item is part of the same cluster as the second audio data item.

The method may further comprise applying a monotonic function to one or more of the updated similarity scores to generate one or more final similarity scores.

Each audio data item may be an audio file or an audio stream.

The pairwise similarity scores, updated pairwise similarity score and/or final similarity scores may indicate a likelihood that the first audio data item and the second audio data item correspond to the same musical composition.

The method may further comprise outputting, on a display, one or more of: the updated similarity score, the final similarity score and the result of the determination of a match.

According to a second aspect of the disclosure, a data processing system is provided. The data processing system comprises means for carrying out the method as set out above.

According to a third aspect of the disclosure, a computer program is provided. The computer program comprises instructions which, when the program is executed by a computer, cause the computer to carry out the method as set out above.

According to a fourth aspect of the disclosure, a computer-readable medium is provided. The computer readable medium comprises instructions which, when executed by a computer, cause the computer to carry out the method as set out above.

BRIEF DESCRIPTION OF THE DRAWINGS

The present disclosure is described below with reference to the accompanying drawings in which.

DETAILED DESCRIPTION

Figures 1A, 1B, 1C:
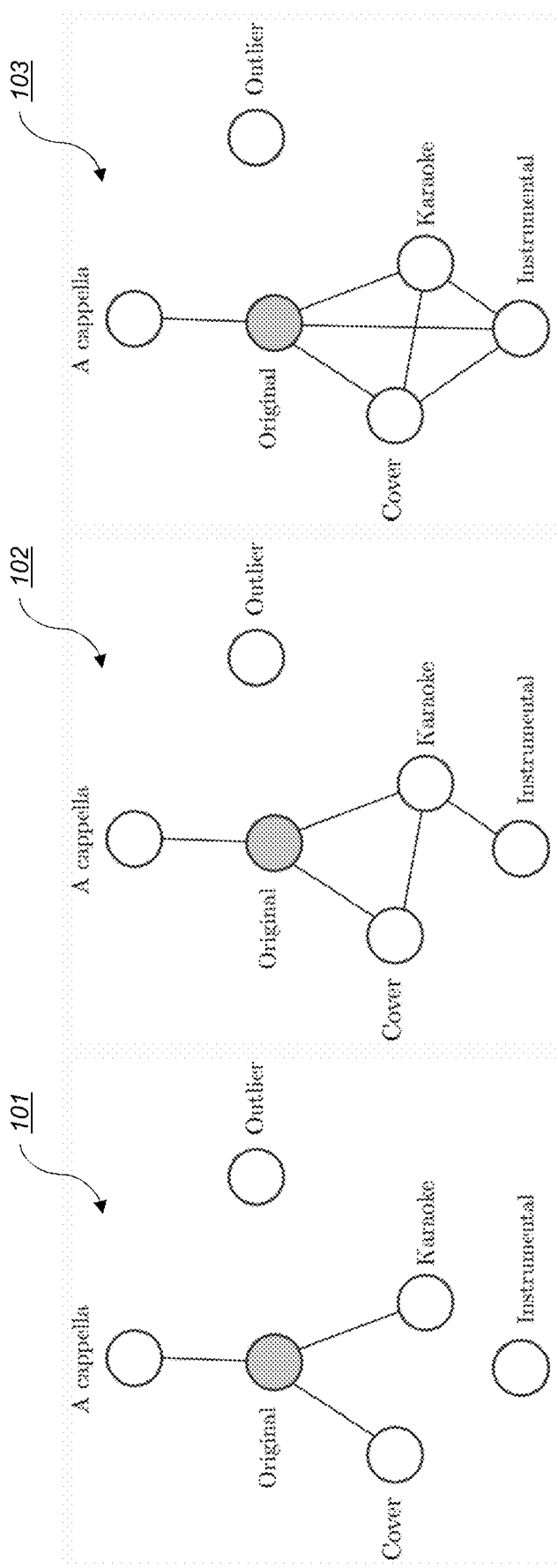
FIG. 1A depicts a prior art approach to matching audio data items.
FIGS. 1B and 1C depict the ensemble approach of some embodiments.

Some embodiments of the present disclosure apply an ensemble approach to identifying similar data items, such as audio files or audio streams corresponding to the same musical composition. In the broadest sense, some embodiments take a pool of data items, which may be pre-filtered according to metadata (e.g. title), and calculates the pairwise similarity scores between a number of unique pairs of data items within the pool. A pairwise distance can be calculated for all of the data items or for an arbitrary selection of data items within the pool. For any given pair of data items, the pairwise similarity score is compared with an overall similarity score for an "indirect path" connecting the pair of data items via one or more intermediate data items. The updated similarity score generated by this comparison then provides an improved indication of the similarity of the data items compared to the prior art method.

In the context of identifying cover versions of audio tracks, this "ensemble" approach of the present disclosure (contrasted to the pairwise approach of the prior art) uses the principle that a cover version may match a reference track poorly, but may match another cover, or "intermediate" version, which is itself closer to the reference track. For instance, an acoustic cover can be difficult to detect on a pairwise basis, but might strongly match a karaoke version which itself strongly matches a reference track. Of course, the same principle applies to other types of data items, for example a heavily compressed video file might poorly match the original, uncompressed video file, but will have a stronger similarity to an intermediate, moderately compressed version of the video file. Thus, while this description focuses on audio data, the reader will understand that some embodiments of the present disclosure are more broadly application to any type of data, and in particular multimedia data such as images and video, where different versions of the data share a common basis or subject. Matching one track to another through an "intermediate" version is also useful for detecting copyright infringement, where the infringing track differs from the original version in some way.

Both of these problems (detecting cover versions and copyright infringement) constitute an enormous technical challenges. As noted above, with tens of millions of existing tracks, and thousands of tracks being added daily, it is simply impossible for human beings to analyse all of the new tracks to determine correspondence. Moreover, the embodiments described below are particularly-suited to computer technology. Whereas a human would generally compare two tracks and subjectively determine whether they sound the same, computers are not capable of doing so. Computers rely on specific methods of analysing tracks to determine a similarity. No human would for example, determine a direct similarity score for two media items, as well as an "indirect" similarity score through an intermediate items, in accordance with some of the embodiments described herein. The embodiments described herein provide practical, technological methods and systems that can quickly, efficiently, and accurately determine track similarities across vast libraries of tracks.

FIGS. 1A to 1C illustrate the ensemble approach of the present disclosure by way of increasingly connected graphs 101 to 103.

FIG. 1A shows an example of the prior art pairwise process. The edges connecting the nodes of the graph represent tracks that are determined to be sufficiently similar to the original track, e.g. determined to correspond underlying musical composition. In this case, pairwise comparisons with Original identify Karaoke, Cover and A cappella as sufficiently similar to Original, but Instrumental and Outlier are not identified as such.

FIG. 1B depicts the initial stage of the process of some embodiments, e.g. calculating the pairwise similarity score between more, or all of the tracks. As can be seen in FIG. 1B, additional edges appear in the graph between Instrumental and Karaoke, and between Cover and Karaoke, indicating determined similarity between these tracks.

Finally, as shown in FIG. 1C, the pairwise similarity scores of the pairs of tracks, e.g. Instrumental—Original, have been compared with the overall similarity scores associated with an indirect path through the graph between the two pairs, e.g. Instrumental—Karaoke—Original. In the example of FIG. 1C, the overall similarity score of the indirect path Instrumental—Karaoke—Original indicates a closer match, e.g. a higher similarity score, or a shorter path, between Instrumental and Original than the original pairwise similarity score between the two tracks. The similarity score has been updated, based on the overall similarity score of the indirect path, and is now shown as a direct link between the two tracks in FIG. 1C.

Figure 2:
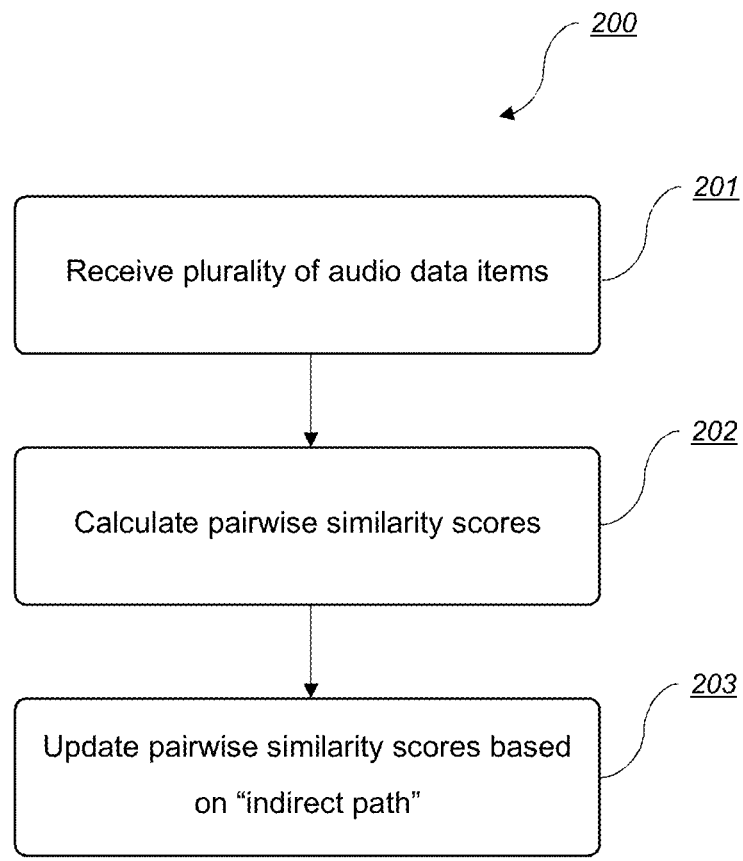
FIG. 2 is a flow diagram depicting a method in accordance with the present disclosure.

FIG. 2 is a flow diagram depicting an outline of a method 200 according to some embodiment. In some embodiments, method 200 is performed by data processing device or system, such as a computer or server that includes one or more processors and memory (e.g., non-transitory memory) storing one or more programs for execution by the one or more processors. In some embodiments, method 200 is performed by specialised hardware specifically adapted to perform the method. The steps of the method 200 may be performed by a single device or system, or may be split across multiple devices that may in turn be disparately located and communicatively coupled, e.g. by the internet.

At step 201, a plurality of audio data items are received (e.g. media content items that include at least audio, and may further include video or images). The audio data items may be audio files comprising encoded audio data in any suitable format, e.g. MP3, Vorbis, AAC or Opus, or in a number of different formats. Alternatively, or additionally, the audio data items may be received as audio streams.

Optionally, the received audio data items may be pre-filtered, e.g. according to metadata, in order to eliminate clear outliers before the more computationally expensive comparison of the audio data is performed in step 202. For example, pre-filtering may include removing audio data items with dissimilar titles: where the overall aim is to identify cover versions of a specific reference track, audio data items with dissimilar titles can be removed from the plurality of data items that is ultimately processed in the method 200.

The step of receiving 201 may include receiving the audio data items from a remote source over a network, or may comprise receiving the audio data items from local storage, e.g. a hard drive or solid state drive that is part of the same overall system. Indeed, the audio data items may be received from a number of different sources, both remote and local.

At step 202, pairwise similarity scores are generated for a plurality of unique pairs of the audio data items received at step 201. Pairwise similarity scores may be generated for all unique pairs of audio data items, or may only be generated for a subset of the unique pairs. Indeed, it is not strictly necessary to generate pairwise similarity scores for every unique pair of audio data items. Instead, a number of the unique pairs can be assigned a default pairwise similarity score, typically indicating low or no similarity, which will then ultimately be updated in step 203 based on the ensemble analysis briefly described with respect to FIG. 1. For example, the pairwise similarity score between Original and Instrumental could have been initially set to the default pairwise similarity score, but the ensemble analysis would still have determined, through the Instrumental—Karaoke—Original indirect path, that Instrumental and Original correspond to the same composition.

Of course, this approach runs the risk that if a large number of pairwise similarity scores are assigned the default and if the plurality of audio data items include a number of isolated audio data items with only a single link to other similar tracks, e.g. A cappella in FIG. 1, then matches may be missed. However, pairwise analysis of audio data items is computationally expensive. As such, assigning the default similarity score to a subset of the plurality of audio data items, instead of calculating the true pairwise similarity score, is significantly less computationally intensive, and can save both time and resources without adversely affecting the overall result, if an appropriate proportion of the pairwise scores are treated in this way.

Any suitable pairwise comparison algorithm may be employed in step 202, e.g. the method described in *Early MFCC And HPCP Fusion for Robust Cover Song Identification*, Christopher J. Tralie, arXiv:1707.04680 [cs.IR]. Most pairwise comparison algorithms presented can be decomposed into two stages: first, a set of meaningful audio features is extracted from each audio data item in the pair, then a similarity score is calculated based on a comparison of the extracted audio features.

The pairwise comparison and generation of pairwise similarity score can be made more efficient by computing the audio features for all the relevant audio data items, then computing all pairwise similarity scores based on these audio features.

Finally, step 202 may also include applying a logistic function to the generated pairwise similarity scores in order to flatten generated scores. In experiments, it was found that almost all negative pairs, e.g. pairs that did not correspond to the same underlying composition, had raw similarity scores above a first value, while raw scores below a second value always corresponded to positive matches. Thus, scores below this first value therefore indicate a high probability of a true match, regardless of how far below the first value the score is, and score above the second value indicate a high probability of no match, again regardless of how high above the second value the score is. However, variations in the score r in between the first and second values have a significant impact on the result. To account for this fact, a logistic function is applied to the pairwise similarity scores to minimise the influence of very high or very low raw pairwise similarity scores while maximising the influence of variations in the most sensitive regions of the score. Any suitable logistic—or squashing—function may be used for this purpose, for example a sigmoid logistic function $f$ of the form:

$$f(x) = \frac{L}{1 + e^{-k(x-x_0)}}$$

Where $x_0$ is the midpoint of the sigmoid, L is the curve's maximum and k is the logistic growth rate.

Following step 202, a collection of pairwise similarity scores for the unique pairs has been generated. Such a collection of pairwise similarity score is depicted in FIG. 3, which shows a matrix 300 of pairwise similarity scores.

Figure 3:
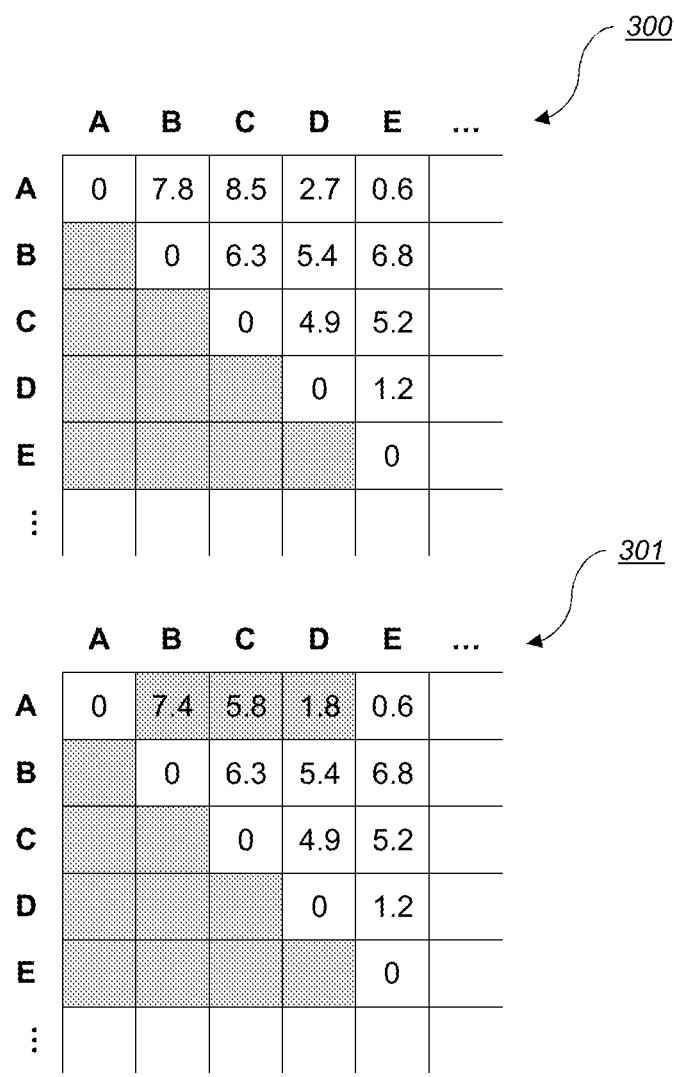
FIG. 3 depicts matrix representations of pairwise similarity scores as they are updated in accordance with some embodiments.

The person of skill in the art, having the benefit of this disclosure, will understand that the specific depiction of the pairwise similarity scores in a matrix layout, as depicted in FIG. 3, is simply a convenient way of representing the scores and is not, itself, essential to the function of the embodiments described herein. Every element in leading diagonal of the matrix 300 show a similarity score of 0, indicating a perfect match. These values are included for illustrative purposes and may not be calculated, or, in some circumstances, even populated as default values since they are not subsequently used. The elements below the leading diagonal of the matrix are greyed-out in FIG. 3, but where, in some embodiments, a matrix representation is used as part of the method, the matrix may be populated with the symmetrical values from the elements above the leading diagonal. Of course, the pairwise comparison of data items may be non-commutative, e.g. the pairwise similarity score (A,B) may be different to the score (B,A), in which case the elements below the leading diagonal of the matrix may be calculated in the same manner as discussed above for the elements above the leading diagonal.

At step 203, the "ensemble" approach of some embodiments is applied to identify updated similarity scores based on a comparison of pairwise similarity scores of unique pairs of audio data items with the overall similarity scores generated from the pairwise similarity scores of an indirect path, e.g. a path including a least one intermediate audio data item, between the audio data items of the given pair. While the process depicted in FIG. 3 shows the originally-calculated pairwise similarity score being replaced by the updated similarity scores, it will be appreciated that the specific implementation of this step of the method may result in the original pairwise similarity scores being replaced with the updated similarity scores in memory, or the updated similarity scores may be stored separately in memory and the original pairwise similarity scores may be maintained.

More specifically, the pairwise similarity score between the first audio data item and the second audio data item of a unique pair is compared with an overall similarity score defined by pairwise distances associated with an indirect path between the first audio data item and the second audio data item. That is, the indirect path defines a continuous chain of pairwise similarity scores between the first audio data item and the second audio data item and includes at least one intermediate audio data item that is different to the first and second audio data items. The overall similarity score of the indirect path is calculated based on the pairwise similarity scores between successive audio data items in the indirect path, for example by summing the similarity scores. A penalty value may also be included in the sum as a penalty for using an indirect path via an intermediate audio data item.

If the overall similarity score of the indirect path indicates a higher similarity than the pairwise similarity score between the first audio data item and second audio data item, then the pairwise similarity score is either replaced or updated with the overall similarity score of the indirect path.

While this has been described with respect to updating a single pairwise similarity score, in practice the same process may be repeated for every pairwise similarity score calculated at step 202. Furthermore, the calculation up updated pairwise similarity scores for all unique pairs may itself be iterated in order to take longer indirect paths into account.

In general this type of approach corresponds to an application of the Floyd-Warshall algorithm to the matrix to update the similarity scores, such that the new distances satisfy the triangular inequality—e.g. for any three audio data items, ensuring that the direct pairwise similarity score between any two of the three audio data items indicates a better or at least as good match as the overall pairwise similarity score of the indirect path via the third audio data item of the three audio data items.

Matrix 301 of FIG. 3 illustrates the state of the example matrix 300 following the application of the first iteration of an example Floyd-Warshall algorithm to its elements. Elements, AB, AC and AD have changed with respect to matrix 300 since, in the case of AB, a lower (e.g. better) similarity score was found by taking the intermediate path A-E-B than A-B directly. Similarly, better scores for A-E-C and A-E-D were found for elements AC and AD respectively. In the case of element AC in particular, it is clear how the close match of data item A with data item E results in a much stronger similarity score than the basis pairwise similarity score would suggest.

Preferably, a loose version of the Floyd-Warshall algorithm is used to ensure that the similarity scores satisfy the triangular inequality most of the time. An example of such a loose Floyd-Warshall algorithm is as follows:

```
1   procedure COLLAPSEDISTANCES(distance matrix D)
2       while D still updates do
3           for i, j in 1..N do
4               D(i, j) ← min(D(i, j), min_{k ~i,j}^{(2)} D(i, k) + D(k, j) + η)
```

Here $\min^{(k)}(x)$ denotes the $k^{th}$ smallest value of a vector x and η is the penalty value for using an indirect path. The algorithm set out above therefore selects the second-best overall similarity score for an indirect path for comparison with the pairwise similarity score, or the updated similarity score from the previous iteration. The application of a conventional Floyd-Warshall algorithm, in which the triangular inequality is always satisfied is particularly sensitive to outliers. By applying a loose version of the Floyd-Warshall algorithm, such as the example set out above, more than one improved similarity score via an indirect path is required to update the similarity score between two given points, resulting in decreased sensitivity to outliers will still providing a good indication of the best similarity score between two given data items.

Of course, the reader will appreciate that even a single iteration of the step of updating the pairwise similarity scores provides improved results over the basic pairwise approach of the prior art. However, the clearest benefit occurs when the iterations are repeated in order to determine the best similarity scores from indirect paths with multiple intermediate data items. Consequently, the iterations may repeat, as shown in the loose Floyd-Warshall algorithm above, until no more updates to the matrix are found. Alternatively, the iterations may repeat until a different stop condition is met, for example when a pre-determined number of iterations has been completed.

Once step 203 finishes, the method may terminate. At this stage, the collection of updated similarity scores produced at step 203 represents improved likelihoods that the audio data items correspond to the same composition. Thus, if the updated similarity scores are represented in a matrix format, such as depicted in FIG. 3, a single row or column can be read off to give an indication of the likelihoods that each of the audio data items in the plurality of audio data items received in step 201 corresponds to the same musical composition as the audio data item represented by the selected row or column.

It will be appreciated that the description of a matrix above is simply one way to represent the similarity scores and the process of updating them. Other mathematically equivalent ways of representing these features, such as the graphs depicted in FIG. 1, are equally applicable to the present disclosure.

The method may continue beyond step 203 and further processing may be carried out on the resulting plurality of updated similarity scores in order to refine the results. For example, if the ultimate goal is to provide a binary prediction of whether any two audio data items correspond to the same musical composition, or are different versions of the same original file for example, then a threshold may be used to provide such a prediction. In the example described above where a lower value of the similarity score corresponds to a closer match, then any pair of audio data items with an updated similarity score that is lower than the threshold may be identified as a match. Conversely, where a higher value of the similarity score indicates a better match, then any pair of audio data items with an updated similarity score that is higher than the threshold may be identified as a match.

The threshold value may simply be set at a value above or below which the confidence of a match is considered to be high. One such way of determining the value is to determine the updated similarity values for one or more additional audio data items that are known not to match a given reference audio data item, or any of the other audio data items within the plurality received at step 201. This similarity value, or an average of similarity values, may then be used as the threshold.

Alternatively, the threshold value can be determined dynamically by computing a distribution of the similarity scores between a particular audio data item and the remaining audio data items, identifying modes of the distribution corresponding to matching and non-matching audio data items, and setting the threshold at a value located between the two modes. This process can be repeated for any given reference audio data item.

Finally, the similarity score or scores generated at step 202 may be directly output, e.g. via a display device, or transmitted to another device, or may be processed to determine a match, as described above, and then subsequently output.

Figure 4:
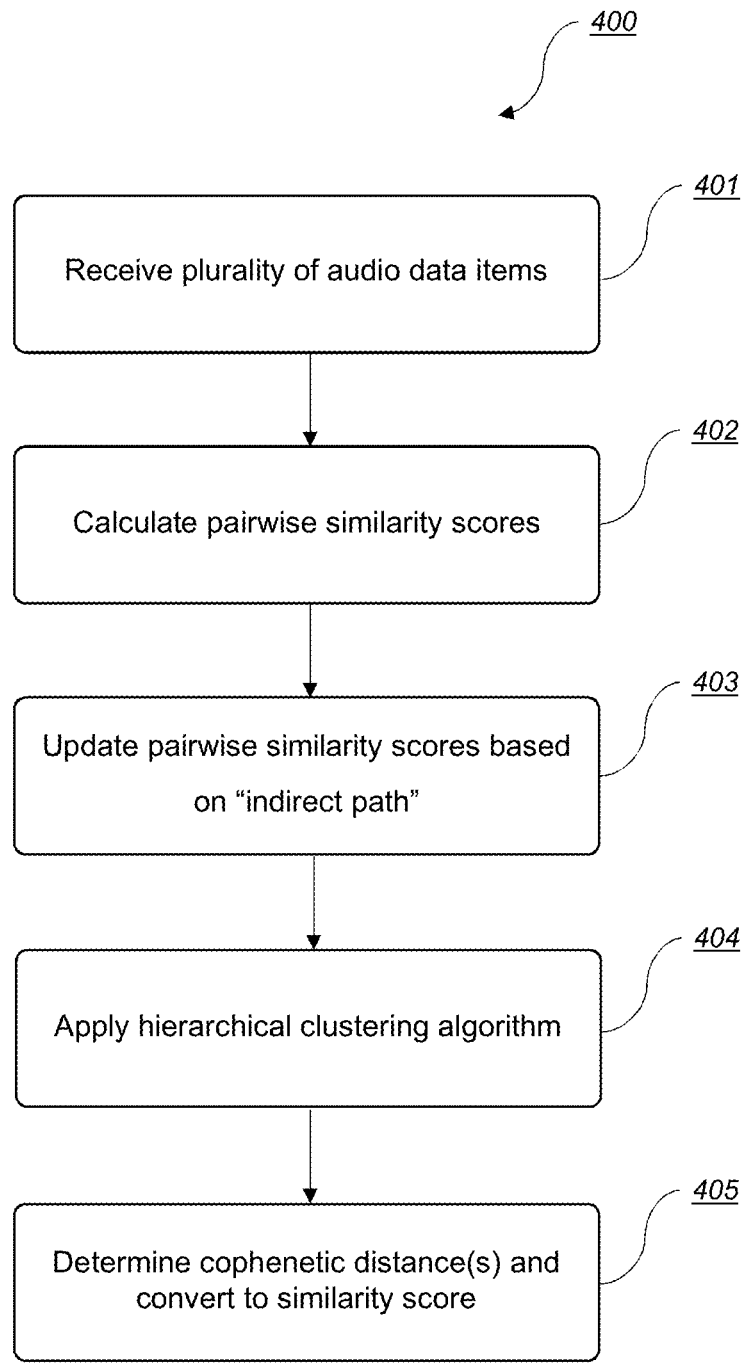
FIG. 4 is a flow diagram depicting an extended method in accordance with some embodiments.

FIG. 4 depicts a method 400, which expands upon the method 200 depicted in FIG. 2. As mentioned above, the method 200 can terminate at step 203 with the collection of updated similarity scores being used directly, or with the use of a criterion (e.g. a similarity score criterion) or threshold, to determine the similarity of the audio data items. Step 401 to 403 of method 400 correspond to steps 201 to 203 of method 200; however, instead of using the similarity scores or a threshold to determine the similarity of audio data items immediately after, additional steps are performed at steps 404 and 405 to identify clusters within the updated similarity scores and use those clusters to determine a final similarity score.

At step 404 of the method 400, a hierarchical clustering algorithm is applied to the updated similarity scores identified in step 403. An example of a suitable hierarchical clustering algorithm can be found in the SciPy hierarchical clustering module for the Python programming language.

At step 405, the cophenetic distance between any two audio data items within the clustered hierarchy is determined. The cophenetic distance is the height of a dendrogram, where the two branches that include the two audio data items merge into a single branch. In this manner, the cophenetic distance can be used an indication of the similarity of the two audio data items: audio data items in the same cluster have a cophenetic distance below a given threshold and are considered to be a perfect or near-perfect match. The threshold for the cophenetic distance can be set at a value for which a single major cluster can generally be identified and contains the majority of the true positives and no false positives. The value of the threshold can be identified in advance by applying the algorithm to one or more training sets of labelled data items, e.g. a set of audio data items in which it is already known which correspond to covers of the same track, and varying the threshold to maximise the accuracy, e.g. to minimise the false positive and/or false negative rates. The threshold value that is found to maximise the accuracy on the training sets can be used with respect to the data items received at step 401. As the cophenetic distance increases, the similarity of the two audio data items decreases. Thus, the cophenetic distance identified at step 405 may be used as an indication of the similarity directly, or it may be processed to produce a final similarity score, for example by applying a monotonic function to the cophenetic distance. An example of such a function is to subtract the cophenetic distance from 100, such that perfect matches have a final similarity score of 100 and an increasing cophenetic distance, and decreasing similarity, produces a similarly decreasing final similarity score.

Once a final similarity score has been determined, either by directly taking the cophenetic distance or by applying a monotonic function to the cophenetic distance, a match may be determined by applying a threshold—either pre-determined or dynamically generated—as described above.

Alternatively, or additionally, the hierarchical clusters may be analysed to identify clusters, similar to the cluster shown in FIG. 1C, within which all audio data items are determined to be a match, e.g. to relate to the same underlying musical composition. This is particularly useful when there is no single reference track with which other tracks are to be compared. For example, if the audio data items received at step 401 are pre-filtered, as described above, to include audio data items with the title "Main Theme", there are many different compositions that the tracks could relate to. Thus, by identifying clusters within the updated similarity scores, as described above, multiple shared compositions can be identified within the received audio data items.

In some embodiments, the systems and methods described herein can be used to detect copyright infringement. For example, in some embodiments, any of the methods described herein (e.g. method 200 and/or method 400) includes determining, based on an updated similarity score with respect to a copyright media content item, that a respective media content item is a copyright violation. In some embodiments, the method includes generating a report, based on the updated similarity score, indicating that the respective media item (e.g. an audio data item) is a copyright violation (e.g. based on the similarity of the respective media item to a copyrighted media item). In some embodiments, the method includes, in response to determining that removing, from a publically-available forum, the respective media content item.

In some embodiments, the systems and methods described herein can be used to suggest cover versions of media items. For example, in some embodiments, any of the methods described herein (e.g. method 200 and/or method 400) includes determining, based on an updated similarity score with respect to an existing media content item, that a respective media content item is a cover version of the existing media content item. In some embodiments, the method includes receiving a user request for the existing media content item. In some embodiments, the method includes, in response to the user request for the existing media content item, providing, to the user, an affordance to select the respective media content item (e.g. providing, on a display of an electronic device, a selectable representation of the respective media content item, wherein in response to selection of the selectable representation, playback of the respective media content item is provided to the user).

Figure 5:
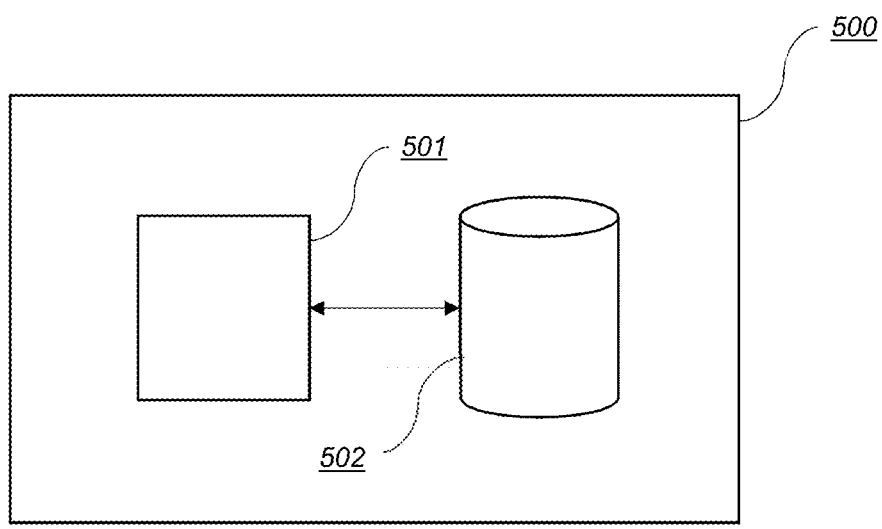
FIG. 5 shows an overview of an electronic device that may be used to implement some embodiments.

In view of the above, it will be appreciated that the present disclosure provides an improved method for identifying audio data items that correspond to a common, or shared, musical composition. Some embodiments of the present disclosure also encompass data processing apparatuses, computer programs and computer readable media that are configured to execute or provide instructions which cause the execution of the methods described herein. For example, the method may be performed by processing circuitry on an electronic device, such as the device 501 shown in FIG. 5, comprising a processor 502 and memory 503. The processor 502 and memory 503 operate as described above. The receipt of data items in step 201 may be carried out over a network connection of the device 501, or the data items may be received by the processor 502 from the memory 503. The similarity score or an indication of whether two or more data items are a match may be output on a display, or any other suitable output means, that is also part of the device 501. Additionally, or alternatively, the similarity scores or indications of a match may be output over a network connection to another device to finally be output to a user of the system.

As mentioned previously, while the embodiments have been discussed in the greatest detail with respect to the problem of identifying audio data items sharing a common musical composition, the methods of the present disclosure are equally applicable to other domains, such as video, images, or any other type of electronic media. In such a scenario, only the specific algorithm used to generate the pairwise scores in step 202 or 402 of the method described above need be adapted to the different data type. Such pairwise comparison algorithms are commonly known.

What is claimed is:

1. A computer-implemented method for determining similarity between audio data items, the method comprising:
   at an electronic device with one or more processors and memory:
      receiving a plurality of audio data items;
      calculating a plurality of pairwise similarity scores between the plurality of audio data items, wherein each pairwise similarity score is calculated for a unique pair of audio data items, and wherein the plurality of pairwise similarity scores includes a pairwise similarity score between a first audio data item of the plurality of audio data items and a second audio data item of the plurality of audio data items; and
      identifying an updated similarity score between the first audio data item of the plurality of audio data items and the second audio data item of the plurality of audio data items, including:
         determining an overall similarity score of an indirect path between the first and second audio data items via at least one intermediate audio data item by combining a calculated pairwise similarity score between the first audio data item and the at least one intermediate audio data item and a calculated pairwise similarity score between the at least one intermediate audio data item and the second audio data item;
         comparing the pairwise similarity score between the first and second audio data items with the overall similarity score of the indirect path between the first and second audio data items via at least one intermediate audio data item, and
         in accordance with a determination that the overall similarity score of the indirect path indicates a higher degree of similarity than the pairwise similarity score between the first and second audio data items, replacing the pairwise similarity score between the first and second audio data items with the overall similarity score of the indirect path as the updated similarity score between the first audio data item and the second audio data item;
   wherein the updated similarity score corresponds to the similarity of the first audio data item to the second audio data item.

2. The method of claim 1, wherein:
   the overall similarity score is calculated based on pairwise similarity scores between audio data items in the indirect path between the first audio data item and the second audio data item, and
   the indirect path defines a continuous chain of pairwise similarity scores between the first audio data item and the second audio data item and includes the at least one intermediate audio data item that is different to the first and second audio data items.

3. The method of claim 1, wherein:
   a plurality of unique pairs of audio data items for which a pairwise similarity score is calculated is a subset of the set of all of the unique pairs of audio data items, and
   default pairwise similarity scores are assigned to the unique pairs of audio data items for which a pairwise similarity score is not calculated.

4. The method of claim 1, further comprising, prior to identifying the updated similarity score, applying a squashing function or logistic function to the pairwise similarity scores.

5. The method of claim 1, wherein the step of identifying the updated similarity score is performed for multiple pairs of audio data items.

6. The method of claim 1, wherein identifying the updated similarity score is iteratively repeated until a stop condition is met.

7. The method of claim 6, wherein the stop condition is met when the identifying ceases to update any of the pairwise similarity scores or when a predetermined number of iterations have been completed.

8. The method of claim 1, further comprising:
   in accordance with a determination that the updated similarity score meets a similarity score criterion, identifying the first audio data item as a copyright violation.

9. The method of claim 8, wherein the similarity score criterion is that the similarity score is above or below a threshold value.

10. The method of claim 9, wherein the threshold value is determined by:
    determining a similarity score for a third audio data item that is known to relate to a different composition or version to the second audio data item and using the determined similarity score as the threshold; or
    computing a distribution of the similarity scores between the first audio data item and the remaining audio data items;
    identifying modes of the distribution corresponding to matching and non-matching audio data items; and
    setting the threshold at a value located between the two modes.

11. The method of claim 1, further comprising:
    applying a hierarchical clustering algorithm to the updated similarity scores; and
    determining a cophenetic distance from the first audio data item to the second audio data item, and outputting the cophenetic distance as a final similarity score.

12. The method of claim 1, further comprising:
    applying a hierarchical clustering algorithm to the updated similarity scores; and determining whether the first audio data item is part of the same cluster as the second audio data item and outputting a result of the determination as an indication of whether the first audio data item matches the second audio data item.

13. The method of claim 1, wherein the pairwise similarity scores, updated pairwise similarity score and/or final similarity scores indicate a likelihood that the first audio data item and the second audio data item correspond to the same musical composition.

14. The method of claim 1, further comprising outputting, on a display or via a network connection, one or more of: the updated similarity score, a final similarity score and a result of the determination of a match.

15. The method of claim 1, further comprising generating a report, based on the updated similarity score, indicating that the first audio data item is a copyright violation.

16. A non-transitory computer-readable medium comprising instructions which, when executed by a computer with one or more processors, cause the one or more processors to perform a set of operations, including:
receiving a plurality of audio data items;
calculating a plurality of pairwise similarity scores between the plurality of audio data items, wherein each pairwise similarity score is calculated for a unique pair of audio data items, and wherein the plurality of pairwise similarity scores includes a pairwise similarity score between a first audio data item of the plurality of audio data items and a second audio data item of the plurality of audio data items; and
identifying an updated similarity score between the first audio data item of the plurality of audio data items and the second audio data item of the plurality of audio data items, including:
determining an overall similarity score of an indirect path between the first and second audio data items via at least one intermediate audio data item by combining a calculated pairwise similarity score between the first audio data item and the at least one intermediate audio data item and a calculated pairwise similarity score between the at least one intermediate audio data item and the second audio data item;
comparing the pairwise similarity score of between the first and second audio data items with the overall similarity score of the indirect path between the first and second audio data items via at least one intermediate audio data item, and
in accordance with a determination that the overall similarity score of the indirect path indicates a higher degree of similarity than the pairwise similarity score between the first and second audio data items, replacing the pairwise similarity score between the first and second audio data items with the overall similarity score of the indirect path as the updated similarity score between the first audio data item and the second audio data item:
wherein the updated similarity score corresponds to the similarity of the first audio data item to the second audio data item.

17. An electronic device, comprising:
one or more processors; and
memory storing one or more programs for execution by the one or more processors, the one or more programs including instructions for:
receiving a plurality of audio data items;
calculating a plurality of pairwise similarity scores between the plurality of audio data items, wherein each pairwise similarity score is calculated for a unique pair of audio data items, and wherein the plurality of pairwise similarity scores includes a pairwise similarity score between a first audio data item of the plurality of audio data items and a second audio data item of the plurality of audio data items; and
identifying an updated similarity score between the first audio data item of the plurality of audio data items and the second audio data item of the plurality of audio data items, including:
determining an overall similarity score of an indirect path between the first and second audio data items via at least one intermediate audio data item by combining a calculated pairwise similarity score between the first audio data item and the at least one intermediate audio data item and a calculated pairwise similarity score between the at least one intermediate audio data item and the second audio data item;
comparing the pairwise similarity score of between the first and second audio data items with the overall similarity score of the indirect path between the first and second audio data items via at least one intermediate audio data item, and
in accordance with a determination that the overall similarity score of the indirect path indicates a higher degree of similarity than the pairwise similarity score between the first and second audio data items, replacing the pairwise similarity score between the first and second audio data items with the overall similarity score of the indirect path as the updated similarity score between the first audio data item and the second audio data item;
wherein the updated similarity score corresponds to the similarity of the first audio data item to the second audio data item.

* * * * *